2,877,027

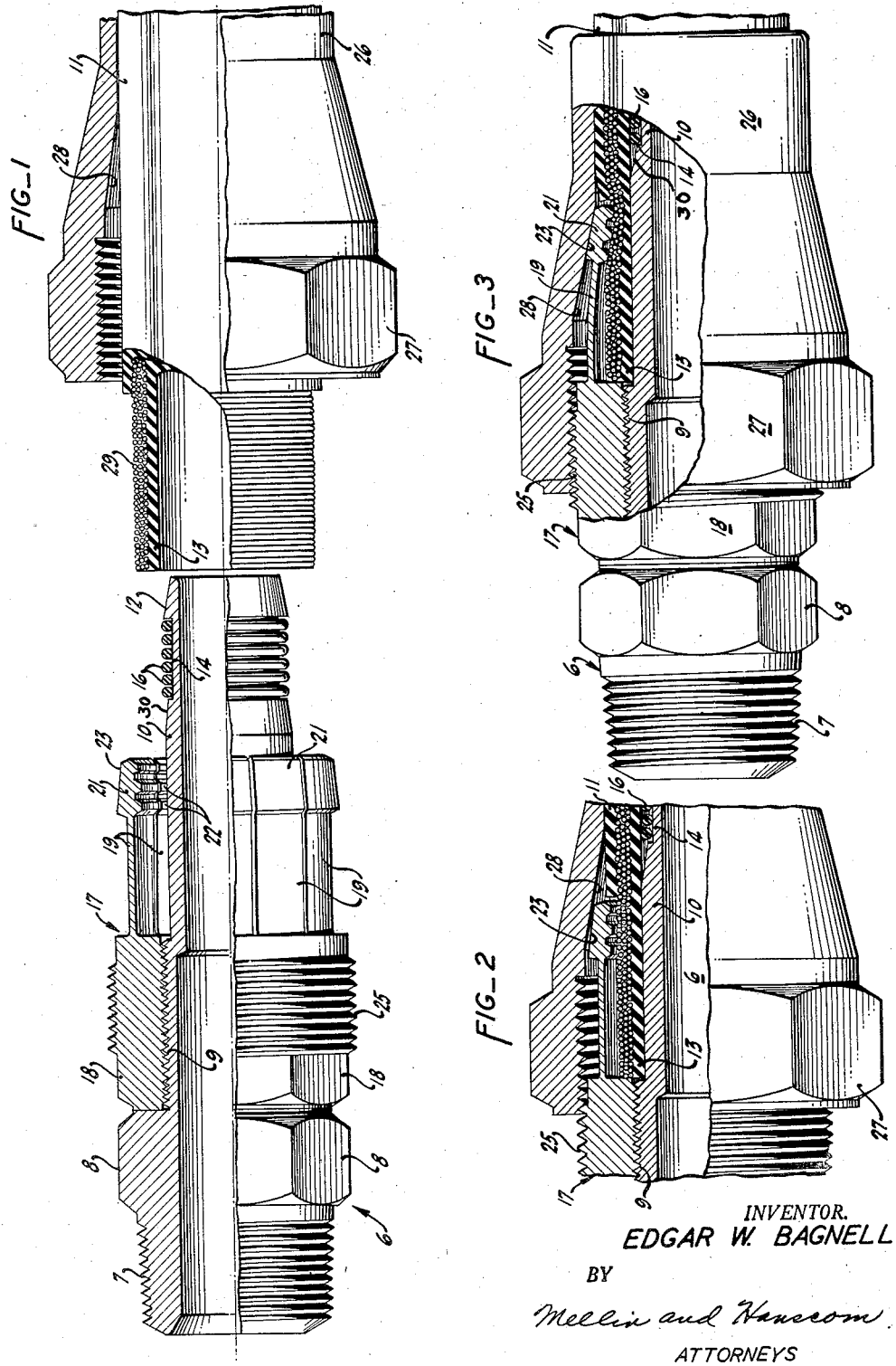
INVENTOR.
EDGAR W. BAGNELL
BY
ATTORNEYS

HIGH PRESSURE HOSE COUPLING WITH PRESSURE-WEDGED SEALING MEANS

Edgar W. Bagnell, Glendale, Calif., assignor to Johnston Testers, Inc., Houston, Tex., a corporation of Texas Application April 30, 1956, Serial No. 581,749

1 Claim. (Cl. 285—113)

This invention relates to hose couplings, and particularly to a coupling for attaching a hose to a high pressure line.

It is among the objects of this invention to provide a device by which a hose may be coupled to a high pressure line in a manner which will effectually prevent displacement of the hose by high pressure within the hose.

Another object is to provide a high pressure coupling which will prevent leakage at the coupling.

A further object is to provide a high pressure coupling embodying improved features of construction facilitating the manufacture and assembly of the device, and affording increased effectiveness in service.

These and other objects, some of which with the foregoing will be hereinafter explained, are accomplished by means of the device illustrated in the accompanying drawings forming a part of this specification. It is to be understood that the invention is not limited to the embodiment selected for illustration in the drawings, as it may be otherwise embodied within the scope of the appended claim.

In the drawings:

Fig. 1 is an exploded view, partly in longitudinal mid-section, of a coupling embodying the invention;

Fig. 2 is a fragmental view showing parts of the coupling in their relation as assembled onto a hose and before they are moved to hose gripping relation, the upper portions of the parts being shown in vertical mid-section; and Fig. 3 is a view of the parts in assembled relation and in gripping engagement with the hose, portions being broken away and shown in section.

In terms of broad inclusion, the device of the present invention comprises a tubular fitting arranged to be connected to a high pressure line and coupled to a flexible hose through the medium of a collet threaded onto the fitting and provided with fingers arranged to be moved into gripping engagement with a hose into which a reduced extension of the fitting is inserted. The fingers have tips arranged to be wedged into engagement with the hose by a sleeve fitted over the hose and threaded onto the collet. The invention also contemplates the provision of a packing means included in the coupling and operable to prevent leakage even at extremely high pressures.

In terms of greater detail, the coupling of the present invention comprises a tubular body designated in general by the numeral 6. A threaded portion 7 is formed at one end of the body for connection into a high pressure line, not shown, the body having a nut portion 8 engageable by a wrench for tightening the body into operative connection with the line in conventional manner. At the other end, the body is provided with a threaded shoulder portion 9, and a reduced extension 10 arranged to be inserted into an end of a flexible hose 11. The outer end of the extension is slightly beveled, as at 12, to facilitate the introduction of the extension into the hose without damaging the inner rubber lining portion 13 thereof.

An annular channel 14 is formed in the outer surface of the extension 10 at a point near the end of the extension. Suitable packing 16, preferably one or a plurality of O-rings, is seated within the channel 14 for effecting sealing engagement with the inner surface of the hose.

A collet, designated in general by the numeral 17, is threaded onto the shoulder portion 7. The inner end of the collet is provided with a wrench engaging portion 18 by which the collet may be turned to tightly seat against the nut portion 8 of the body. At its outer end, the collet is provided with a plurality of fingers 19 extending longitudinally from the collet in spaced relation to the extension 10. Gripping tips 21 are provided at the ends of the fingers 19. Ribs 22 are formed upon the inner faces of the tips 21, and the outer surfaces taper outwardly at a slight angle, as at 23. The fingers 19 are sufficiently light and resilient to permit the tips to spread enough to pass onto the end of the hose, and to be pressed together in clamping engagement with the hose. As illustrated, the collet is formed of suitable metal with the inner and outer surfaces channelled to form a relatively thin band of material extending from the body of the collet to the enlarged gripping tips. The channelled portion is split longitudinally to separate the band into a plurality of fingers arranged to embrace the end of the hose into which the extension 10 is inserted.

A sleeve 26 is shaped at one end to fit neatly over the hose. The other end is enlarged, and is internally threaded to engage the threaded outer portion of the collet. A wrench engaging portion 27 is formed on the sleeve, by which the sleeve may be tightened onto threads 25 upon the collet 17. The inner surface of the sleeve is tapered from the threaded inner end to the hose fitting outer end, as at 28, at an angle substantially conforming to the angle at which the tripping tips 21 are tapered. At the large end, the tapered area clears the tips 21, and the small end of the area is of lesser diameter than the normal diameter of the row of tips.

In operation, the end of a length of flexible high pressure hose is stripped down to its embedded core of reinforcing wire, as indicated at 29. The sleeve 26 is moved onto the end of the hose, and the extension 10 is inserted into the hose until the end of the hose seats against the outer end of the threaded shoulder portion 9. The fingers 19 of the collet, which is initially screwed tightly onto the shoulder portion 9, extend over the hose, and the ribbed inner surfaces 22 of the tips 21 form substantially a continuous band around the hose.

The sleeve 26 is then moved along the hose until it can be screwed onto the shoulder portion 9. As the sleeve approaches the shoulder, the tapered inner surface of the sleeve clears the tips of the fingers, as indicated in Fig. 2 of the drawings. As the sleeve is tightened onto the shoulder, the inner surface of the sleeve engages the correspondingly tapered ends of the fingers and causes the gripping tips to be wedged into tight retaining engagement with the hose, as shown in Fig. 3.

When the hose is subjected to high internal pressure, the hose 11 tends to expand under pressure. The O rings 16, under the action of the pressure, move from their original location in channel 14 onto the tapered surface 30 of the reduced diameter extension 10, thereby filling the void between the tapered surface 30 and the hose 11 created by the expansion of the hose. Enough O rings are provided to keep the void space packed off as the expansion increases, even until the hose bursts.

The coupling, as above described, is particularly suited for use in coupling hose to high pressure lines such as those employed in connection with the drilling and operation of oil wells, and for similar purposes where high pressures prevail. The blunt edges of the ribs 22 are forced into tightly engaging relation to the strands of reinforcing wire at a distance sufficiently spaced from the end of the hose to prevent displacement of the hose by any pressure that the hose, itself, will carry. Under test, the coupling, as illustrated, has been subjected to pressure up to 17,000 pounds per square inch without damage, and without leakage past the packing 16.

Having thus described the invention, what I claim and desire to secure by Letters Patent is:

In a high pressure hose coupling: a high pressure hose having an embedded core of reinforcing wire and having an end portion stripped to said reinforcing wire; a tubular body including a nut portion, a threaded shoulder portion and a reduced extension portion, said extension portion having a cylindrical outer surface and a tapered extremity, said outer surface arranged for sliding insertion within the end of the hose, said extension portion further including an annular channel extending longitudinally of said extension portion, said channel having a cylindrical bottom surface portion of lesser diameter than the said extension portion and end wall surfaces, one of said end walls being disposed adjacent said tapered extremity, the other of said end walls being of substantially less height than the other and connected by a slightly tapered wall portion to the outer cylindrical surface of said extension portion and forming an annular void between said tapered wall portion and the inner surface of said hose at least when high pressure fluid is applied; a plurality of annular O-ring packing rings seated within said channel and normally sealingly engaging the said bottom surface and said hose inner surface and adapted to move under applied pressure into wedging engagement between the inner wall of the hose and the said tapered wall portion; means upon the other end of said body adjacent said nut portion for attachment to a high pressure line; an annular collet having internal and external threaded portions, said internal threaded portion arranged to be threadedly connected to said threaded shoulder portion; a plurality of individual spring fingers extending from said collet arranged concentrically with and radially outwardly of said extension portion so as to extend over the hose end received by said extension portion, said spring fingers including gripping tips upon the free ends thereof having inner annular ribs arranged to grip said stripped portion of said reinforcing wire at points located between said threaded shoulder portion and said annular channel; a connecting sleeve mounted on said hose for longitudinal movement thereon and having one end portion internally threaded to couple with said externally threaded portion of said collet and having an opposite end portion arranged for sliding engagement with said hose to press an unstripped portion of said hose into tight engagement with said annular packing means when said sleeve is coupled to said collet, said sleeve further having an internal frustoconical wedging surface between said ends thereof arranged to slidably engage said gripping tips to wedge said ribs into gripping engagement with said reinforcing wire as said sleeve is threadedly coupled to said collet.

References Cited in the file of this patent

UNITED STATES PATENTS

| | | |
|---|---|---|
| 2,051,557 | Hunziker | Aug. 18, 1936 |
| 2,120,275 | Cowles | June 14, 1938 |
| 2,446,599 | Knaggs | Aug. 10, 1948 |
| 2,453,997 | MacWilliam | Nov. 16, 1948 |
| 2,749,150 | Kaiser | June 5, 1956 |

FOREIGN PATENTS

| | | |
|---|---|---|
| 406,685 | Great Britain | Feb. 27, 1934 |